US010387050B2

(12) United States Patent
Dube et al.

(10) Patent No.: US 10,387,050 B2
(45) Date of Patent: Aug. 20, 2019

(54) SYSTEM AND METHOD FOR PROVIDING ACCESSIBILITY FOR ACCESS CONTROLLER STORAGE MEDIA

(71) Applicant: DELL PRODUCTS L.P., Round Rock, TX (US)

(72) Inventors: Shawn Joel Dube, Austin, TX (US); Quy N. Hoang, Round Rock, TX (US); Timothy M. Lambert, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 14/746,418

(22) Filed: Jun. 22, 2015

(65) Prior Publication Data
US 2015/0286422 A1 Oct. 8, 2015

Related U.S. Application Data

(63) Continuation of application No. 12/465,348, filed on May 13, 2009, now Pat. No. 9,071,624.

(51) Int. Cl.
*G06F 3/06* (2006.01)
*G06F 11/20* (2006.01)
(Continued)

(52) U.S. Cl.
CPC ............ *G06F 3/0617* (2013.01); *G06F 3/067* (2013.01); *G06F 3/0653* (2013.01);
(Continued)

(58) Field of Classification Search
None
See application file for complete search history.

(56) References Cited

U.S. PATENT DOCUMENTS 6,032,227 A * 2/2000 Shaheen ............. G06F 12/0813
711/129
9,400,879 B2 * 7/2016 Tredoux ................ H04L 9/3231
(Continued)

OTHER PUBLICATIONS

Lambert et al.; "System and Method for Providing Accessibility for Access Controller Storage Media"; U.S. Appl. No. 12/465,348, filed May 13, 2009; pp. 38.

*Primary Examiner* — Henry Tsai
*Assistant Examiner* — Christopher A Bartels
(74) *Attorney, Agent, or Firm* — Baker Botts L.L.P.

(57) ABSTRACT

Systems and methods for reducing problems and disadvantages associated with traditional approaches to providing accessibility and redundancy for access controller storage media are provided. A method for providing accessibility for storage media of an access controller in an information handling system may include: (i) emulating the storage media such that the storage media appears to an operating system executing on the information handling system as storage media locally attached to the information handling system; (ii) mounting the storage media such that data may be communicated between the storage media and a processor integral to the access controller; (iii) mounting a portion of a network-attached storage remote to the information handling system such that data may be communicated between the portion of the network-attached storage and the processor; and (iv) maintaining redundancy between the storage media and the portion of network-attached storage in accordance with a redundancy policy.

20 Claims, 3 Drawing Sheets

(51) Int. Cl.
*H04L 12/26* (2006.01)
*H04L 29/08* (2006.01)
*H04L 12/24* (2006.01)

(52) U.S. Cl.
CPC ........ *G06F 11/201* (2013.01); *H04L 43/0811* (2013.01); *H04L 67/1095* (2013.01); *H04L 67/1097* (2013.01); *H04L 41/06* (2013.01)

(56) References Cited

U.S. PATENT DOCUMENTS

| | | | |
|---|---|---|---|
| 2002/0016827 A1* | 2/2002 | McCabe | G06F 11/2058 709/213 |
| 2002/0052985 A1* | 5/2002 | Furuumi | G06F 12/0868 710/5 |
| 2004/0070920 A1* | 4/2004 | Flueli | G06F 9/4411 361/500 |
| 2006/0031447 A1* | 2/2006 | Holt | H04L 12/24 709/223 |
| 2007/0024643 A1* | 2/2007 | Naya | G06F 3/1454 345/629 |
| 2007/0079025 A1* | 4/2007 | Gloekler | G06F 13/4054 710/58 |
| 2007/0168481 A1 | 7/2007 | Lambert et al. | 709/223 |
| 2007/0174034 A1 | 7/2007 | Naydon et al. | 703/24 |
| 2007/0206630 A1* | 9/2007 | Bird | H04L 41/24 370/465 |
| 2008/0239656 A1* | 10/2008 | Sasagawa | G06F 1/187 361/679.37 |
| 2008/0240230 A1* | 10/2008 | Oxman | H04N 5/4401 375/240.01 |
| 2009/0013210 A1* | 1/2009 | McIntosh | H04L 41/0672 714/4.1 |
| 2009/0055157 A1* | 2/2009 | Soffer | G06F 15/7864 703/27 |
| 2009/0161692 A1* | 6/2009 | Hirata | H04L 49/351 370/466 |
| 2009/0172326 A1 | 7/2009 | Sandorfi | 711/162 |
| 2009/0216866 A1* | 8/2009 | Lu | G06F 9/4416 709/222 |
| 2010/0115257 A1 | 5/2010 | Hoang et al. | 713/2 |
| 2013/0159761 A1* | 6/2013 | Baumgartner | H04L 1/22 714/4.5 |
| 2014/0247834 A1* | 9/2014 | Poulsen | H04L 7/0066 370/458 |
| 2014/0281071 A1* | 9/2014 | Xu | G06F 13/42 710/105 |

\* cited by examiner

SYSTEM AND METHOD FOR PROVIDING ACCESSIBILITY FOR ACCESS CONTROLLER STORAGE MEDIA

CROSS-REFERENCE TO RELATED APPLICATION

The present application is a continuation application of copending U.S. patent application Ser. No. 12/465,348 filed May 13, 2009, which is hereby incorporated by reference in its entirety for all purposes.

TECHNICAL FIELD

The present disclosure relates in general to information handling systems, and more particularly to providing accessibility and redundancy for storage media associated with an access controller of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, consumers of information handling systems utilize information handling systems without hard disk drives local to the information handling system (e.g., a server blade). Traditionally, information handling systems may typically boot from an "embedded hypervisor" or operating system via an internal solid-state storage media (e.g., FLASH, such as a USB key drive or secure digital card, for example) which is directly coupled to the information handling system and is unmanaged. Such unmanaged storage often includes operating system and configuration information. However, such traditional approaches do not easily permit accessibility to or redundancy of the media, meaning any failure of such media may not be easily recoverable and may lead to undesired system downtime.

SUMMARY

In accordance with the teachings of the present disclosure, the disadvantages and problems associated with provisioning of information handling systems using access controllers have been reduced or eliminated.

In accordance with an embodiment of the present disclosure, a method for providing accessibility for storage media of an access controller in an information handling system is provided. The method may include emulating the storage media such that the storage media appears to an operating system executing on the information handling system as storage media locally attached to the information handling system. The method may also include mounting the storage media such that data may be communicated between the storage media and a processor integral to the access controller. The method may additionally include mounting a portion of a network-attached storage remote to the information handling system such that data may be communicated between the portion of the network-attached storage and the processor. The method may further include maintaining redundancy between the storage media and the portion of network-attached storage in accordance with a redundancy policy.

In accordance with another embodiment of the present disclosure, an access controller for use in an information handling system may include a processor, a storage media communicatively coupled to the processor, and a storage emulation module communicatively coupled to the storage media. The storage emulation module may be configured to emulate the storage media such that the storage media appears to an operating system executing on an information handling system in which the access controller is disposed as storage media locally attached to the information handling system.

In accordance with yet another embodiment of the present disclosure, an information handling system may include a processor, a memory communicatively coupled to the processor, and an access controller communicatively coupled to the processor. The access controller may have storage media and may be configured to: (i) emulate the storage media such that the storage media appears to an operating system executing on the processor as storage media locally attached to the information handling system; (ii) mount the storage media and a portion of network-attached storage remote to the information handling system such that data may be communicated between the portion of the network-attached storage and the storage media; and (iii) maintain redundancy between the storage media and the portion of network-attached storage in accordance with a redundancy policy.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-3D, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
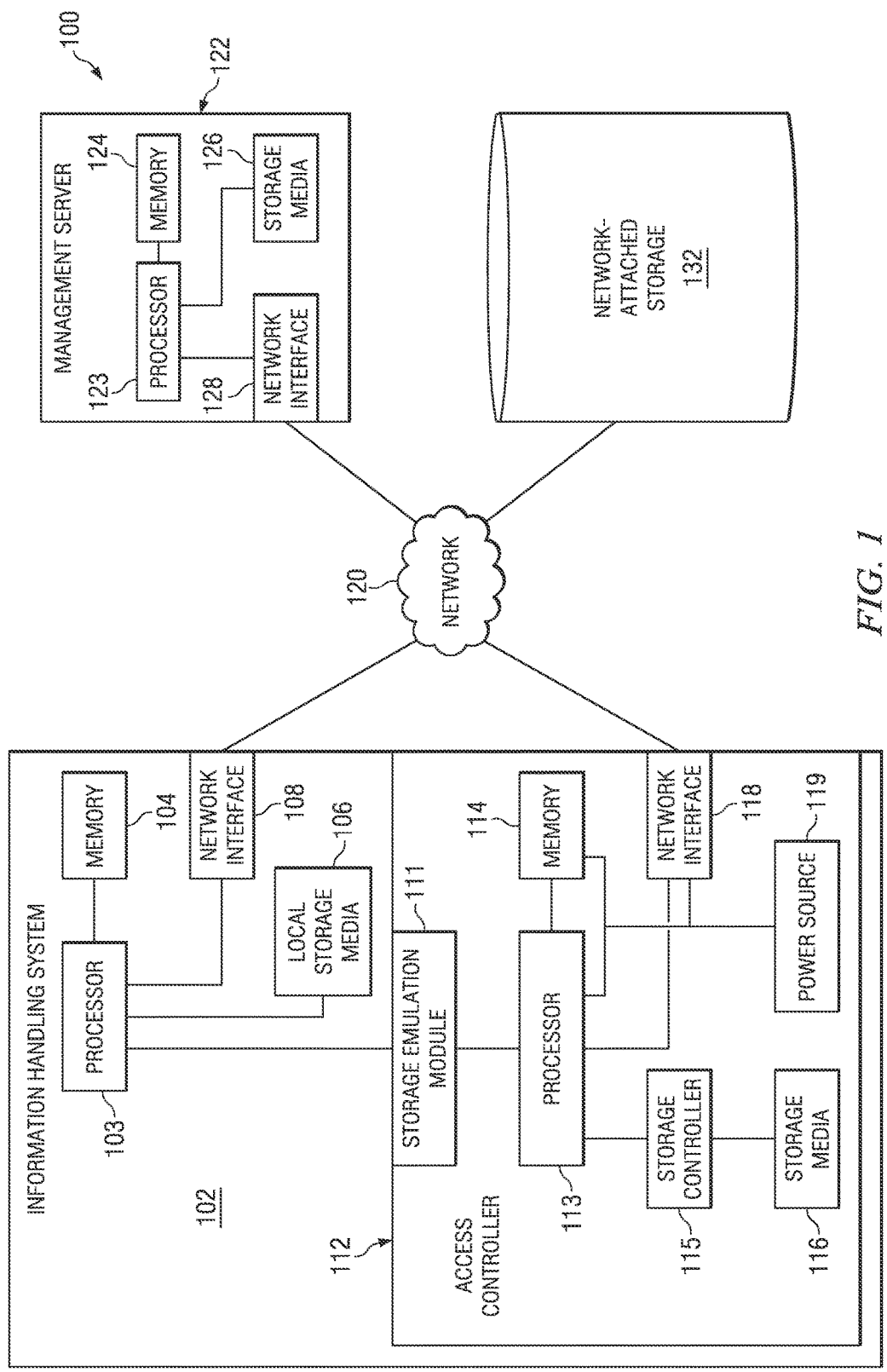
FIG. 1 illustrates a block diagram of an example system for providing accessibility to and redundancy of storage media associated with an access controller of an information handling system, in accordance with certain embodiments of the present disclosure.

FIG. 1 illustrates a block diagram of an example system 100 for providing accessibility to and redundancy of storage media 116 associated with an access controller 112 of an information handling system 102, in accordance with certain embodiments of the present disclosure. As depicted in FIG. 1, system 100 may include an information handling system 102, a network 120, a management server 122, and a network-attached storage 132.

Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, storage media 106 communicatively coupled to processor 103, a network interface 108 communicatively coupled to processor 103, and an access controller 112 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 106 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Local storage media 106 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs). In certain embodiments, information handling system 102 may not include local storage media 106.

Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. In certain embodiments, network interface 108 may be configured with hardware, software, and/or firmware to allow its associated information handling system 102 to remotely boot from a computer-readable medium remote from information handling system 102 (e.g., a computer-readable medium coupled to network interface 108 via network 120).

Access controller 112 may be any system, device, or apparatus configured to permit an administrator or other person to remotely monitor and/or remotely manage information handling system 102 (e.g., via an information handling system remotely connected to information handling system 102 via network 120) regardless of whether information handling system 102 is powered on and/or has an operating system installed thereon. In certain embodiments, access controller 112 may allow for "out-of-band" control of information handling system 102, such that communications to and from access controller 112 are communicated via a management channel physically isolated from the "in band" communication with network interface 108. Thus, for example, if a failure occurs in information handling system 102 that prevents an administrator from remotely accessing information handling system 102 via network interface 108 (e.g., operating system failure, power failure, etc.), the administrator may still be able to monitor and/or manage the information handling system 102 (e.g., to diagnose problems that may have caused failure) via access controller 112. In the same or alternative embodiments, access controller 112 may allow an administrator to remotely manage one or more parameters associated with operation of information handling system 102 (e.g., power usage, processor allocation, memory allocation, security privileges, etc.). In certain embodiments, access controller 112 may include or may be an integral part of a Dell Remote Access Controller (DRAC) or an Integrated Dell Remote Access Controller (iDRAC).

As depicted in FIG. 1, access controller 112 may include a processor 113, a memory 114 communicatively coupled to processor 113, a storage emulation module 111, storage controller 115, storage media 116, a network interface 118 communicatively coupled to processor 113, and a power source 119 electrically coupled to processor 113.

Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off or power to access controller 112 is removed. In certain embodiments, memory 114 may store firmware that includes executable instructions to govern operation of access controller 112.

Storage emulation module 111 may be communicatively coupled to processor 103 via a bus, and may generally operable to emulate storage media 116 such that data stored on storage media 116 appears to an operating system executing on information handling system 102 as if it is stored on a storage device local to information handling system 102 (e.g., a mass storage device such as key drive or secured digital card, for example). In certain embodiments, storage emulation module 111 may emulate storage media 116 such that data stored on storage media 116 appears as a universal serial bus (USB) storage device local to information handling system 102. Accordingly, via storage emulation module 111, processor 103 may be communicatively coupled to storage media 116 and may be able to issue input/output (I/O) requests (e.g., read and/or write requests) to access controller 112 which may be stored in and/or retrieved from storage media 116. Although storage emulation module 111 is depicted as being communicatively coupled directly to processor 103, storage emulation module 111 may be directly communicatively coupled to storage controller 115 and/or storage media 116 in addition to or in lieu of processor 113. Storage emulation module 111 may be implemented using hardware, software, or any combination thereof.

Storage controller 115 may be communicatively coupled to processor 113 and may include any system, apparatus, or device operable to manage the communication of data between storage media 116 and processor 113. In certain embodiments, storage controller 115 may provide functionality including, without limitation, input/output routing, and error detection and recovery. Storage controller 115 may be implemented using hardware, software, or any combination thereof.

Storage media 116 may generally include computer-readable media operable to store data and/or programs. Storage media 116 may include computer-readable media (e.g., hard disk drive, and/or other type of rotating storage media, flash memory, EEPROM, and/or other type of solid state storage media) and may be generally operable to store data and/or programs (e.g., one or more operating systems and/or one or more application programs). In some embodiments, storage media 116 may be integral to access controller 112, such that storage media 116 is a "fixed" or "permanent" component of access controller 112 (e.g., such that removal of storage media 116 would cause inoperability of access controller 112). In other embodiments, storage media 116 may be a removable component of access controller 112. Storage media 116 may be installed in access controller 112 by a manufacturer, end user, and/or any other suitable mechanism. In some embodiments, storage media 116 may be externally accessible by an end user and/or administrator. For example, in certain embodiments, storage media 116 may include a computer-readable medium (e.g., a flash card, universal serial bus drive, etc.) that may be added and/or interfaced with access controller 112 via an external hardware port. Storage media 116 may include any collection of data and/or instructions suitable to facilitate operation of information handling system 102, including, without limitation, one or more operating systems (e.g., hypervisor, Windows-based operating system, Linux-based operating system, etc.), configuration data associated with the information handling system 102, the operating systems configured to execute on information handling system 102, and/or the application programs configured to execute on information handling system 102. In certain embodiments, storage media 116 may include bootable media, such that information handling system 102 may boot using instructions stored on storage media 116 (e.g., such boot instructions may be communicated to processor 103 via storage emulation module 111).

Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Power source 119 may include any system, device, or apparatus configured to and provide electrical energy to one or more components of access controller 112. In certain embodiments, power source 119 may include an alternating current (AC) or direct current (DC) source wherein electrical energy is provided from an electrical outlet (e.g., a 120-volt wall outlet). In certain embodiments, power source 119 may include a battery that stores electrochemical energy and provides electrical energy to one or more components of access controller 112. For example, power source 119 may be a rechargeable battery, meaning that its electrochemical energy may be restored by the application of electrical energy (e.g., a lead and sulfuric acid battery, nickel cadmium (NiCd) battery, nickel metal hydride (NiMH) battery, lithium ion (Li-ion) battery, lithium ion polymer (Li-ion polymer) battery, or any combination of the foregoing, or any other suitable battery). In operation, power source 119 may provide electrical energy to one or more electrical or electronic components (e.g., processor 113, memory 114, network interface 118) supplemental to or in lieu of a "main" power source of information handling system 102 (e.g., electrical power provided via an electrical outlet or a main system battery of information handling system 102).

Network 120 may be a network and/or fabric configured to communicatively couple information handling system 102, access controller 112, management server 122, network-attached storage 132, other information handling systems, and/or other networked components to each other. Network 120 may include a communication infrastructure, which provides physical connections, and a management layer, which organizes the physical connections, information handling system 102, access controller 112, management server 122, and network-attached storage 132. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Management server 122 may comprise an information handling system and may generally be operable to receive data from and/or communicate data to one or more other information handling systems via network 120. In certain embodiments, management server 122 may be configured to communicate data and/or instructions to information handling system 102 in order to manage, maintain, and/or control information handling system 102 and/or its various components, as discussed in greater detail elsewhere in this disclosure. In the same or alternative embodiments, management server 122 may manage, maintain, and/or control information handling system 102 using one or more management-based protocols, such as simple network management protocol (SNMP) or Intelligent Platform Management Interface (IPMI), for example. As depicted in FIG. 1, management server 122 may include a processor 123, a memory 124 communicatively coupled to processor 123, storage media 126 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124, storage media 126 and/or another component of management server 122.

Memory 124 may be communicatively coupled to processor 123 and may include any system, device, or apparatus configured to retain program instructions and/or data for a period of time (e.g., computer-readable media). Memory 124 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to management server 122 is turned off.

Storage media 126 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 128 may include any suitable system, apparatus, or device operable to serve as an interface between management server 122 and network 120. Network interface 128 may enable management server 122 to communicate over network 120 using any suitable transmission protocol and/or standard, including without limitation all transmission protocols and/or standards enumerated above with respect to the discussion of network 120. In certain embodiments, network interface 128 may be configured with hardware, software, and/or firmware to allow its associated management server 122 to remotely boot from a computer-readable medium remote from management server 122 (e.g., a computer-readable medium coupled to network interface 128 via network 120).

Network-attached storage 132 may comprise one or more storage resources, and may be communicatively coupled to information handling system 102 and/or management server 122 via network 120. Storage resources integral to network-attached storage may include hard disk drives, magnetic tape libraries, optical disk drives, magneto-optical disk drives, compact disk drives, compact disk arrays, disk array controllers, and/or any computer-readable medium operable to store data. In operation, all or a portion of the storage resources of network-attached storage 132 may appear to an operating system executing on information handling system 102 as a single logical storage unit or virtual storage resource. Thus, processor 103 may detect a single virtual storage resource instead of detecting each individual storage resource of network-attached storage 132.

In certain embodiments, one or more of the storage resources of network-attached storage 132 may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc. In the same or alternative embodiments, one or more storage resources of network-attached storage 132 may be disposed within a storage enclosure configured to hold and power one or more storage resources.

In operation, storage media 116 may be populated (e.g., via out-of-band administration with management server 122) with operating system and/or hypervisor software, as well as desired configuration data for information handling system 102. Storage emulation module 111 may emulate storage media 116 to processor 103 to enable boot of information handling system from storage media 116. In addition, as set forth in greater detail below, network-attached storage device 132 may be used to provide redundancy to storage media 116 according to a redundancy policy.

Figure 2:
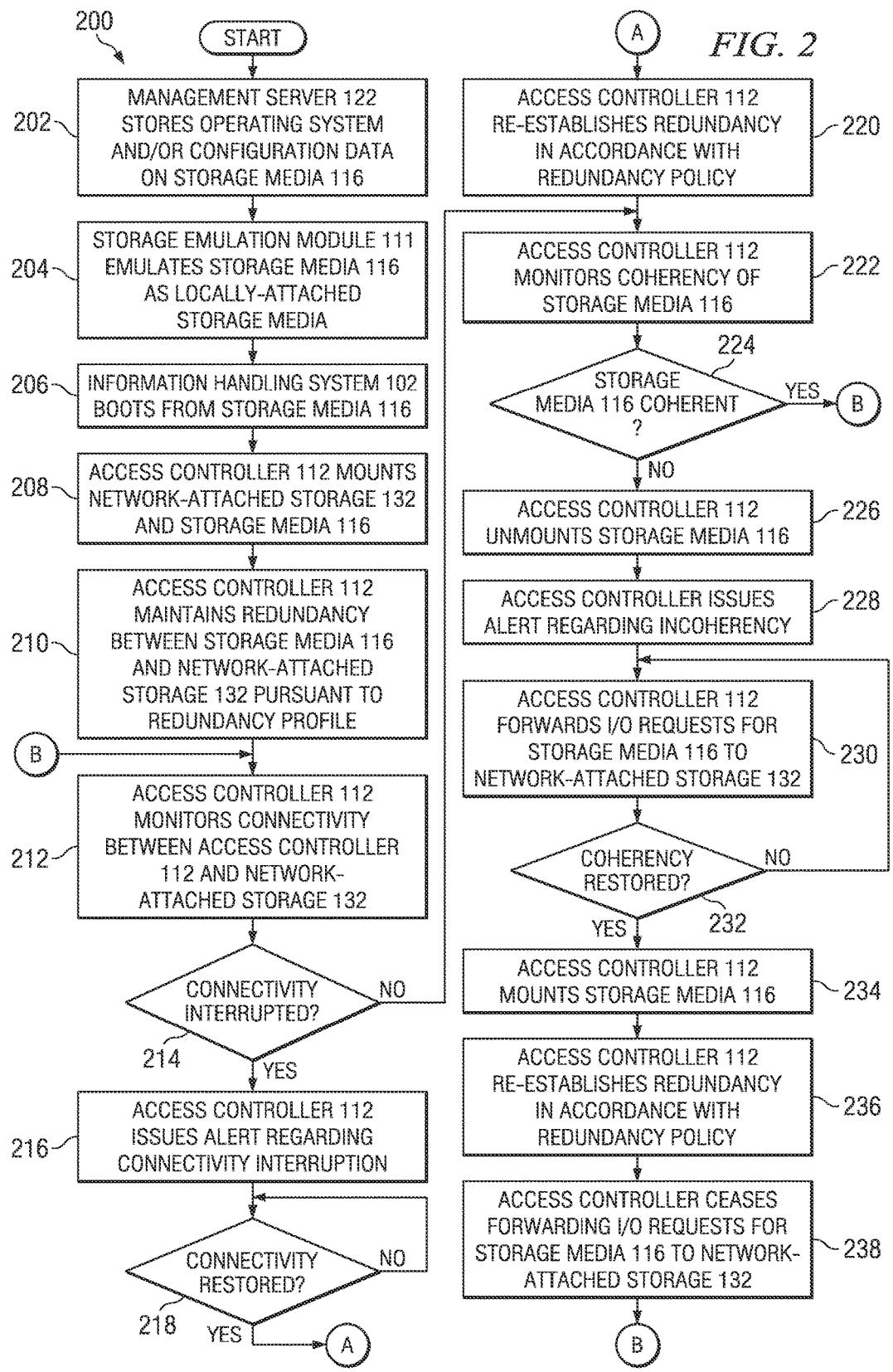
FIG. 2 illustrates a flow chart of an example method for providing accessibility to and redundancy of storage media associated with an access controller, in accordance with certain embodiments of the present disclosure.

FIG. 2 illustrates a flow chart of an example method 200 for providing redundancy of storage media (e.g., storage media 116) associated with an access controller (e.g., access controller 112), in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-238 comprising method 200 may depend on the implementation chosen.

At step 202, management server 122 may store one or more operating systems (e.g., hypervisor, Windows-based operating system, Linux-based operating system, and/or other bootable media) and/or configuration data on storage media 116.

At step 204, storage emulation module 111 may emulate storage media 116 as a storage device locally-attached to information handling system 102 (e.g., as a USB storage device).

At step 206, information handling system 102 may, via the emulation provided by storage emulation module 111, boot from an operating system stored on storage media 116.

At step 208, access controller 112 may mount all or a portion of network-attached storage 132 associated with information handling system 102 and may mount storage media 116, such that processor 113 may read data from and/or write data to each of the network-attached storage 132 (e.g., via network interface 118) and storage media 116 (e.g., via storage controller 115).

At step 210, access controller 112 may maintain redundancy between storage media 116 and network-attached storage 132 pursuant to a selected redundancy profile. The redundancy profile may include any suitable method for providing data redundancy between storage media 116 and network-attached storage 132. The redundancy profile may be selected by an administrator of system 100, a user of information handling system 102, by processor 103 or processor 113 according to a program of instructions, or in any other suitable way. Examples of redundancy policies are discussed in greater detail below in reference to FIGS. 3A-3D.

At step 212, access controller 112 may monitor connectivity between access controller 112 and network-attached storage 132. Connectivity between access controller 112 and network-attached storage 132 may be interrupted for any number of reasons, including without limitation, a failure and/or fault associated with access controller 112, network interface 108, network interface 118, network 120, and/or network-attached storage 132. Such interruption in connectivity may be detected in any suitable manner (e.g., determination that a network link has been lost and/or detection of an interruption via an Intelligent Platform Management Interface alert). Any such interruption may indicate at least a partial loss of redundancy between storage media 116 and network-attached storage 132.

At step 214, access controller 112 may determine if connectivity between access controller 112 and network-attached storage 132 is presently interrupted. If connectivity is interrupted, method 200 may proceed to step 216. Otherwise, if connectivity of not interrupted, method 200 may proceed to step 222.

At step 216, in response to determining the existence of a connectivity interruption between access controller 112 and network-attached storage 132, access controller 112 may issue an alert indicative of the connectivity interruption. In certain embodiments, such alert may be communicated to management server 122, so that an administrator may be made aware of the connectivity interruption and associated loss of redundancy. In the same or alternative embodiments, the alert may cause a user-detectible signal (e.g., an activated LED, display notification, audible sound, etc.) to be activated at information handling system 102 and/or management server 122.

At step 218, access controller 112 may determine whether connectivity has been restored between access controller 112 and network-attached storage 132. If connectivity has been restored, method 200 may proceed to step 220. Otherwise, if connectivity has not been restored, step 218 may repeat until connectivity is restored.

At step 220, in response to a determination that previously-interrupted connectivity between access controller 112 and network-attached storage 132 has been restored, access controller 112 may re-establish redundancy between storage media 116 and network-attached storage 132, in accordance with the selected redundancy policy.

At step 222, access controller 112 may monitor storage media 116 for coherency. "Coherency" as used herein means that storage media 116 is operating correctly, whereas "incoherency" may denote a storage media 116 that has experienced a fault, failure, and/or error.

At step 224, access controller 112 may determine if storage media 116 is coherent. If storage media 116 is coherent, method 200 may proceed again to step 212. Otherwise, if storage media 116 is incoherent, method 200 may proceed to step 226. Any such incoherency may indicate at least a partial loss of redundancy between storage media 116 and network-attached storage 132.

At step 226, in response to a determination that storage media 116 is incoherent, access controller 112 may unmount storage media 116 and cease maintaining redundancy.

At step 228, access controller 112 may issue an alert indicative of the incoherency of storage media 116. In certain embodiments, such alert may be communicated to management server 122, so that an administrator may be made aware of the connectivity interruption and associated loss of redundancy. In the same or alternative embodiments, the alert may cause a user-detectible signal (e.g., an activated LED, display notification, audible sound, etc.) to be activated at information handling system 102 and/or management server 122.

At step 230, access controller 112 may forward all input/output requests from information handling system 102 to storage media 116 (e.g., read and/or write requests communicated from processor 103 to storage emulation module 111) to network-attached storage 132, so that the data subject to the input/output requests may be read from and/or written to the portion of network-attached storage 132 providing redundancy to storage media 116.

At step 232, access controller 112 may determine if coherency has been restored. Coherency may be restored if the incoherent storage media has been appropriately repaired and/or replaced. If coherency has been restored, method 200 may proceed to step 234. Otherwise, in incoherency remains, method 200 may proceed again to step 230.

At step 234, in response to a determination that coherency has been restored, access controller 112 may mount storage media 116. If coherency was restored by replacement of the previously-incoherent storage media 116, the storage media 116 mounted in this step may be the replacement storage media.

At step 236, access controller 112 may re-establish redundancy between storage media 116 and network-attached storage 132, in accordance with the selected redundancy policy.

At step 238, access controller 112 may cease forwarding input/output requests for storage media 116 (e.g., read and/or write requests communicated from processor 103 to storage emulation module 111) to network-attached storage 132, so that such requests may be again communicated to storage media 116. After completion of step 238, method 200 may proceed again to step 212.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Figure 3A:
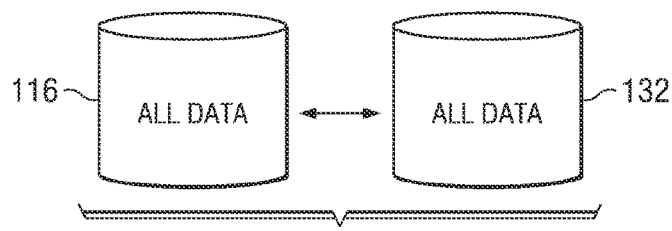
FIGS. 3A-3D illustrate block diagrams of example redundancy policies for redundancy of storage media associated with an access controller of an information handling system, in accordance with certain embodiments of the present disclosure.

FIGS. 3A-3D illustrate block diagrams of an example redundancy policies for redundancy of storage media 116 associated with access controller 112 of information handling system 100, in accordance with certain embodiments of the present disclosure. FIG. 3A illustrates a redundancy policy that may be labeled a "full-redundancy policy." Under such a policy, changes to data on storage media 116 may also be made to the portion of network-attached storage 132 corresponding to storage media 116, and vice versa. Accordingly, storage media 116 and network-attached storage are maintained in synchronization in a bidirectional manner. Such a policy not only allows changes made to storage media 116 to be backed up to network-attached storage 132, but also permits updates, configurations, and/or upgrades to be written by an administrator to network-attached storage 132, which may then be "pushed" to storage media 116 for use by information handling system 132.

Figure 3B:
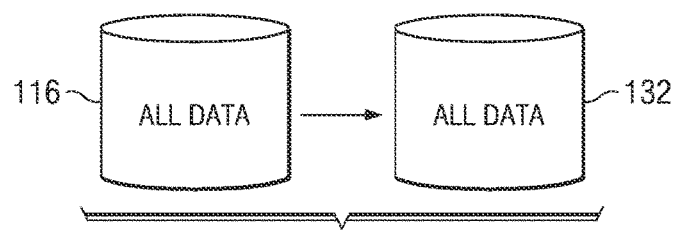

FIG. 3B illustrates a redundancy policy that may be labeled a "local-only back-up policy." Under such a policy, changes to data on storage media 116 may also be made to the portion of network-attached storage 132 corresponding to storage media 116, but not vice versa (with exceptions for when data may be restored to storage media 116 from network-attached storage 132 following an incoherency event related to storage media 116). The policy depicted in FIG. 3B, or similar policies, may be used in connection with migration of data stored in storage media 116 to another information handling system 102 (e.g., in accordance with a "rip and replace" of an "old" information handling system with a "new" information handling system).

Figure 3C:
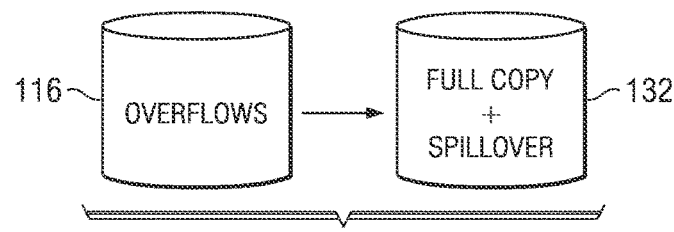

FIG. 3C illustrates a redundancy policy that may be labeled an "overflow policy." Such a policy may be utilized when the aggregate amount of data desired to be stored to storage media 116 exceeds the storage capacity of storage media 116. In accordance with the policy depicted in FIG. 3C, an amount of data up to the storage capacity of storage media 116 may be stored on storage media 116, while the contents of storage media 116 may be backed-up to network-attached storage 132, and data exceeding the capacity of storage media 116 may also be written to network-attached storage 132. Such a policy assures data desired to be written to storage media 116 may still be written even if such data exceeds capacity, in order that such data may be maintained in network-attached storage 132 until such time as the overflow situation is addressed (e.g., deletion of data or replacement of storage media 116 with a larger-capacity device).

Figure 3D:
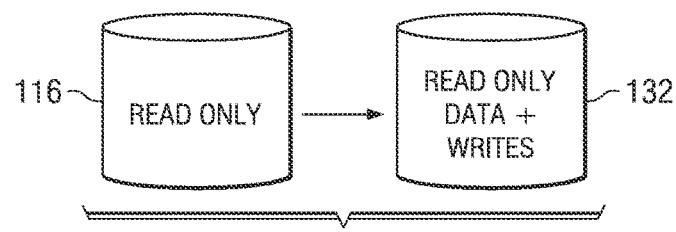

FIG. 3D illustrates a redundancy policy that may be labeled a "local read-only policy." Under this policy, writes intended for storage media 116 may be redirected to network-attached storage 132 such that network-attached storage maintains a back-up of data stored on storage media 116 as well as all writes intended for storage media 116. Such a policy may be desirable in situations where an administrator and/or user desires to maintain boot reliability (e.g., prevent accidental deletion or overwriting of boot data) and/or reduce wear on storage media 116.

Using the methods and systems disclosed herein, problems associated with conventional approaches to provisioning of an information handling system may be improved, reduced, or eliminated. For example, the methods and systems disclosed herein allow an information handling system to access storage media associated with an access controller, as well as permit the information handling system to boot from such media. In addition, the methods and systems disclosed herein allow redundancy of such storage media to a network-attached storage device. Redundancy in connection with the network-attached storage device may provide numerous benefits associated with system management (e.g., allows "push" of data from network-attached storage to local access controller storage media, facilitates migration of local storage media data, etc.).

Although the present disclosure has been described in detail, it should be understood that various changes, substitutions, and alterations can be made hereto without departing from the spirit and the scope of the disclosure as defined by the appended claims.

What is claimed is:

1. A method comprising:
   mounting, by an access controller used in an information handling system, storage media within the access controller such that a processor of the access controller is communicatively coupled with the storage media;
   mounting, by the access controller, one or more storage resources of a network-attached storage that is remote to the access controller such that the one or more storage resources of the network-attached storage are communicatively coupled with the access controller;
   providing, by the one or more storage resources of the network-attached storage, redundancy to the storage media; and
   monitoring connectivity between the access controller and the one or more storage resources of the network-attached storage, the monitoring including determining whether there has been an interruption in connectivity between the access controller and the one or more storage resources of the network-attached storage associated with a loss of redundancy.

2. The method of claim 1, wherein the redundancy is provided to the storage media according to a redundancy policy specifying which types of changes to data in the information handling system are to be made redundant.

3. The method of claim 2, further comprising:
   monitoring coherency of the storage media;

detecting incoherency of the storage media in response to monitoring the coherency of the storage media;
unmounting the storage media in response to detecting the incoherency of the storage media;
remounting the storage media in response to the unmounting and further in response to detecting that coherency of the storage media is restored; and
re-establishing redundancy between the storage media and the one or more storage resources of the network-attached storage according to the redundancy policy in response to remounting the storage media.

4. The method of claim 1, further comprising detecting an interruption in connectivity between the access controller and the one or more storage resources of the network-attached storage.

5. The method of claim 4, wherein detecting the interruption comprises determining that a network link has been lost.

6. The method of claim 4, wherein detecting the interruption comprises detecting an Intelligent Platform Management Interface alert.

7. The method of claim 4, further comprising determining, subsequent to detecting the interruption in the connectivity between the access controller and the one or more storage resources of the network-attached storage, that the connectivity is restored.

8. The method of claim 7, further comprising;
re-establishing redundancy between the storage media and the one or more storage resources of the network-attached storage according to the redundancy policy in response to determining that the connectivity is restored.

9. An access controller for use in an information handling system, comprising:
a processor; and
a machine-readable medium communicatively coupled to the processor and comprising instructions that, when read and executed by the processor, cause the processor to:
mount storage media within the access controller such that the processor is communicatively coupled with the storage media;
mount one or more storage resources of a network-attached storage that is remote to the access controller such that the one or more storage resources of the network-attached storage are communicatively coupled with the access controller; and
monitor connectivity between the access controller and the one or more storage resources of the network-attached storage, the monitoring to include determining whether there has been an interruption in connectivity between the access controller and the one or more storage resources of the network-attached storage associated with a loss of redundancy provided by the one or more storage resources of the network-attached storage to the storage media.

10. The access controller of claim 9, wherein the one or more storage resources of the network-attached storage are configured to provide the redundancy to the storage media according to a redundancy policy specifying which types of changes to data in the information handling system are to be made redundant.

11. The access controller of claim 10, wherein the instructions further cause the processor to:
monitor coherency of the storage media;
detect incoherency of the storage media in response to monitoring the coherency of the storage media;
unmount the storage media in response to detecting the incoherency of the storage media;
remount the storage media in response to unmounting the storage media and further in response to detecting that coherency of the storage media is restored; and
re-establish redundancy between the storage media and the one or more storage resources of the network-attached storage according to the redundancy policy in response to remounting the storage media.

12. The access controller of claim 9, wherein the instructions further cause the processor to detect an interruption in connectivity between the access controller and the one or more storage resources of the network-attached storage.

13. The access controller of claim 12, wherein to detect the interruption, the processor is to perform at least one of determining that a network link has been lost and detecting an Intelligent Platform Management Interface alert.

14. The access controller of claim 12, wherein:
the one or more storage resources of the network-attached storage are configured to provide the redundancy to the storage media according to a redundancy policy prior to detecting the interruption in connectivity; and
the instructions further cause the processor to:
determine, subsequent to detecting the interruption in the connectivity between the access controller and the one or more storage resources of the network-attached storage, that the connectivity is restored; and
re-establish redundancy between the storage media and the one or more storage resources of the network-attached storage according to the redundancy policy in response to determining that the connectivity is restored.

15. An information handling system comprising:
a processor;
a machine readable medium communicatively coupled to the processor; and
an access controller communicatively coupled to the processor, the access controller being configured to:
mount storage media within the access controller such that the processor is communicatively coupled with the storage media;
mount one or more storage resources of a network-attached storage that is remote to the information handling system such that the one or more storage resources of the network-attached storage are communicatively coupled with the access controller; and
monitor connectivity between the access controller and the one or more storage resources of the network-attached storage, the monitoring to include determining whether there has been an interruption in connectivity between the access controller and the one or more storage resources of the network-attached storage associated with a loss of redundancy provided by the one or more storage resources of the network-attached storage to the storage media.

16. The information handling system of claim 15, wherein the one or more storage resources of the network-attached storage are configured to provide the redundancy to the storage media according to a redundancy policy specifying which types of changes to data in the information handling system are to be made redundant.

17. The information handling system of claim 16, wherein the access controller is further configured to:
monitor coherency of the storage media;
detect incoherency of the storage media in response to monitoring the coherency of the storage media;

unmount the storage media in response to detecting the incoherency of the storage media;

remount the storage media in response to unmounting the storage media and further in response to detecting that coherency of the storage media is restored; and re-establish redundancy between the storage media and the one or more storage resources of the network-attached storage according to the redundancy policy in response to remounting the storage media.

18. The information handling system of claim 15, wherein the access controller is further configured to detect an interruption in connectivity between the access controller and the one or more storage resources of the network-attached storage.

19. The information handling system of claim 18, wherein to detect the interruption, the access controller is configured to perform at least one of determining that a network link has been lost and detecting an Intelligent Platform Management Interface alert.

20. The information handling system of claim 18, wherein:

the one or more storage resources of the network-attached storage are configured to provide the redundancy to the storage media according to a redundancy policy prior to detecting the interruption in connectivity; and the access controller is further configured to:

determine, subsequent to detecting the interruption in the connectivity between the access controller and the one or more storage resources of the network-attached storage, that the connectivity is restored; and re-establish redundancy between the storage media and the one or more storage resources of the network-attached storage according to the redundancy policy in response to determining that the connectivity is restored.

* * * * *